(12) United States Patent
Kim

(10) Patent No.: US 8,995,886 B2
(45) Date of Patent: Mar. 31, 2015

(54) DEVICE FOR AUTOMATICALLY SUPPLYING TONER TO TONER CARTRIDGE

(76) Inventor: Tae Soo Kim, Daejeon (KR)

( * ) Notice: Subject to any disclaimer, the term of this patent is extended or adjusted under 35 U.S.C. 154(b) by 0 days.

(21) Appl. No.: 13/983,052

(22) PCT Filed: Oct. 14, 2011

(86) PCT No.: PCT/KR2011/007654
§ 371 (c)(1),
(2), (4) Date: Jul. 31, 2013

(87) PCT Pub. No.: WO2012/105741
PCT Pub. Date: Aug. 9, 2012

(65) Prior Publication Data
US 2013/0308985 A1    Nov. 21, 2013

(30) Foreign Application Priority Data

Feb. 1, 2011    (KR) .......................... 10-2011-0010069

(51) Int. Cl.
*G03G 15/08*    (2006.01)

(52) U.S. Cl.
CPC ........ *G03G 15/0832* (2013.01); *G03G 15/0894* (2013.01); *G03G 15/0865* (2013.01); *G03G 15/0855* (2013.01)
USPC .......................................... 399/258; 399/119

(58) Field of Classification Search
CPC .......... G03G 15/0832; G03G 15/0874; G03G 15/0877; G03G 15/0879
USPC .................................................. 399/119, 258
See application file for complete search history.

(56) References Cited

U.S. PATENT DOCUMENTS

| | | | |
|---|---|---|---|
| 5,971,208 A | * | 10/1999 | Kennedy ........................ 222/54 |
| 2008/0213003 A1 | * | 9/2008 | Sano ............................ 399/258 |
| 2013/0209140 A1 | * | 8/2013 | Murakami et al. ............ 399/258 |

FOREIGN PATENT DOCUMENTS

| | | | |
|---|---|---|---|
| JP | 06230671 A | * | 8/1994 |
| JP | 2000-147884 | | 5/2000 |
| JP | 2009-128429 | | 6/2009 |
| KR | 10-2005-0063905 | | 6/2005 |

(Continued)

OTHER PUBLICATIONS

International Search Report for PCT/KR2011/007654 mailed Apr. 24, 2012.

*Primary Examiner* — Ryan Walsh
(74) *Attorney, Agent, or Firm* — AKC Patents LLC; Aliki K. Collins

(57) ABSTRACT

The device for automatically supplying a toner to a toner cartridge of the present invention includes: a toner storage container for storing toners to be refilled; an outer container for containing the toner storage container; a toner supplying unit for supplying the toner stored in the toner storage container to the toner cartridge; and a toner supply hose for sending the toner to the toner cartridge, wherein the toner supplying means consists of: a balloon, which expands and contracts when air is supplied to or discharged from the inside, so that the toner at the bottom is pushed in towards the cartridge or the toner at the top moves to supplement the bottom; an air pump for supplying air to the balloon; an air pipe for connecting the balloon and the air pump; a control valve; and a controller for operating the control valve, enabling the present invention to print stably by preventing toner shortage.

12 Claims, 11 Drawing Sheets

(56) References Cited

FOREIGN PATENT DOCUMENTS

| KR | 10-0892392 | 4/2009 |
| KR | 10-0961094 | 5/2010 |
| KR | 10-0971476 | 7/2010 |

* cited by examiner

DEVICE FOR AUTOMATICALLY SUPPLYING TONER TO TONER CARTRIDGE

RELATED APPLICATIONS

This application is a 371 application of International Application No. PCT/KR2011/007654, filed Oct. 14, 2011, which in turn claims priority from Korean Patent Application No. 10-2011-0010069, filed Feb. 1, 2011, each of which is incorporated herein by reference in its entirety.

TECHNICAL FIELD

The present invention relates to a device for automatically supplying toner to a toner cartridge of a laser printer or copy machine, and more particularly, to an automatic toner supply device in which toner is automatically filled from the outside by using a balloon that is expanded or contracted when air is supplied to or discharged from the inside thereof to push toner toward a cartridge or supplement lower toner with upper toner, and if an nonexistence of toner is detected by a low sensor, a controller controls the balloon to change a volume of the balloon, thereby supplying or discharge air into or from the balloon by a preset number.

BACKGROUND ART

In general, copy machines or laser printers perform copying or printing by using powder-type toner. Here, a cartridge in which a drum is coupled to a toner accommodation part is mainly used. Also, most of cartridges containing toner is consumable and disposable and has a high price because it is impossible to refill toner. Thus, when toner filled in a cartridge is exhausted, the cartridge should be replaced with a new cartridge. As a result, maintenance costs may be expensive, and waste of resources may be serious. Accordingly, there is a growing need of an automatic cartridge filling device that detects a residual quantity of toner without separating an active cartridge from a main body to automatically fill lacking toner.

In a toner refill device according to a related art, black and white toner is supplied merely by rotation of a rotation screw. Thus, the toner may not be smoothly supplied by the rotation screw, and it may be impossible to confirm residual quantity of toner within the cartridge. In addition, the toner may be excessively supplied or leaked. Also, in the toner refill device according to the related art, since it is difficult to confirm a charged state of a toner refill tank, the state of the toner refill tank should be frequently confirmed.

Also, Korean Patent No. 10-0980385, titled "Automatic Cartridge Toner Refiller of Laser Printer" which is disclosed by the present inventor has a limitation in which it is difficult to fill a tank 100% full of toner because the toner is filled by using only air.

DISCLOSURE OF THE INVENTION

Technical Problem

An object of the present invention is to provide a device for automatically supplying toner to a toner cartridge of a laser printer or copy machine, in which toner is filled into a cartridge without separating the active cartridge from a body, and if an nonexistence of toner within the cartridge is detected by a low sensor, air is supplied or discharged by preset numbers under the control of the control part to inject the toner by a volume change of a balloon, i.e., by the balloon serving as a piston, and air is additionally supplied into a lower portion of a guide to assist the filling of the toner, and then, after the supply or discharge by the preset numbers is finished, the stopping operation is continued so that suitable toner exists always within the toner cartridge.

Technical Solution

According to an aspect of the present invention, there is provided an automatic toner supply device for automatically supplying toner into a toner cartridge, the automatic toner supply device including: a toner storage container for storing toner to be refilled; an outer container for accommodating the toner storage container; a toner supply unit for supplying the toner stored in the toner storage container into a toner cartridge; and a toner supply hose connected to a lower portion of the toner storage container to transfer the toner into the toner cartridge by the toner supply unit.

The toner supply unit may include: a balloon that is expanded or contracted when air is supplied into or discharged from the inside thereof to push lower toner toward the cartridge or supplement the lower toner with upper toner; an air pump for supplying air into the balloon; an air pipe for connecting the balloon to the air pump; and a control part for receiving a signal transmitted from the toner cartridge, the control part including a controller controlling the toner supply unit.

The outer container may include: a body constituting a frame of the outer container; a cap for opening or closing an upper portion of the outer container; and a support for supporting the body.

The toner storage container may include: a main body in which most of the toner is stored; and a guide coupled to a lower portion of the main body and disposed within the balloon, the guide having a lower portion including a cone angled at an angle greater than an angle of repose so that the toner is easily moved downward and a cylindrical-shaped upper portion in which the toner within a lower portion of the balloon is inserted by the expansion of the balloon.

An air injection hole through which a portion of air discharged from the air pump is injected and an air injection pipe branched from a discharge-side air pipe of the air pump and connected to the air injection hole may be disposed in the lower portion of the guide, and an electrical valve may be disposed in the air injection pipe to supply the toner into the toner cartridge due to an air pressure generated by injecting air into a lower portion of the toner storage container when the balloon is expanded, wherein the electrical valve may be opened or closed by a signal of the controller.

A supplement hole through which the toner is supplemented and a handle for opening the cap to take the toner storage container out may be disposed on an upper portion of the main body, and a toner discharge hole through which the toner is supplied into the toner cartridge may be defined in a lower portion of the guide.

The main body of the toner storage container may be replaced with a new main body when the toner to be refilled is exhausted, a lower portion of the main body and an upper portion of the guide may be screw-coupled to each other, a cap for preventing the toner from leaking downward may be disposed on a lower end of the main body, and when the main body is screw-coupled to the guide, the cap of the main body may be lifted to discharge the toner within the main body downward.

The control valve may include a 3-way valve to inject air into the balloon or discharge the air within the balloon by a signal of the controller.

The balloon may be repeatedly expanded and contracted by numbers that are initially input in the controller to supply the toner into the toner cartridge.

The objects of the present invention may be obtained through the device for automatically supplying the toner into the toner cartridge.

Advantageous Effects

In the device for automatically supplying toner into the toner cartridge according to the present invention, since the active cartridge of the laser print or copy machine is automatically filled with toner without separating the cartridge from the body, there is a convenience that the lacking toner may be filled without separating the toner cartridge from the body. Also, since the main injection method for toner uses a volume change, possibility of malfunction of the toner supply device may be significantly reduced. Also, when the low sensor is used, since suitable toner is always disposed within the cartridge, the shortage of the toner may be prevented to realize stable printing.

MODE FOR CARRYING OUT THE INVENTION

Figure 1:
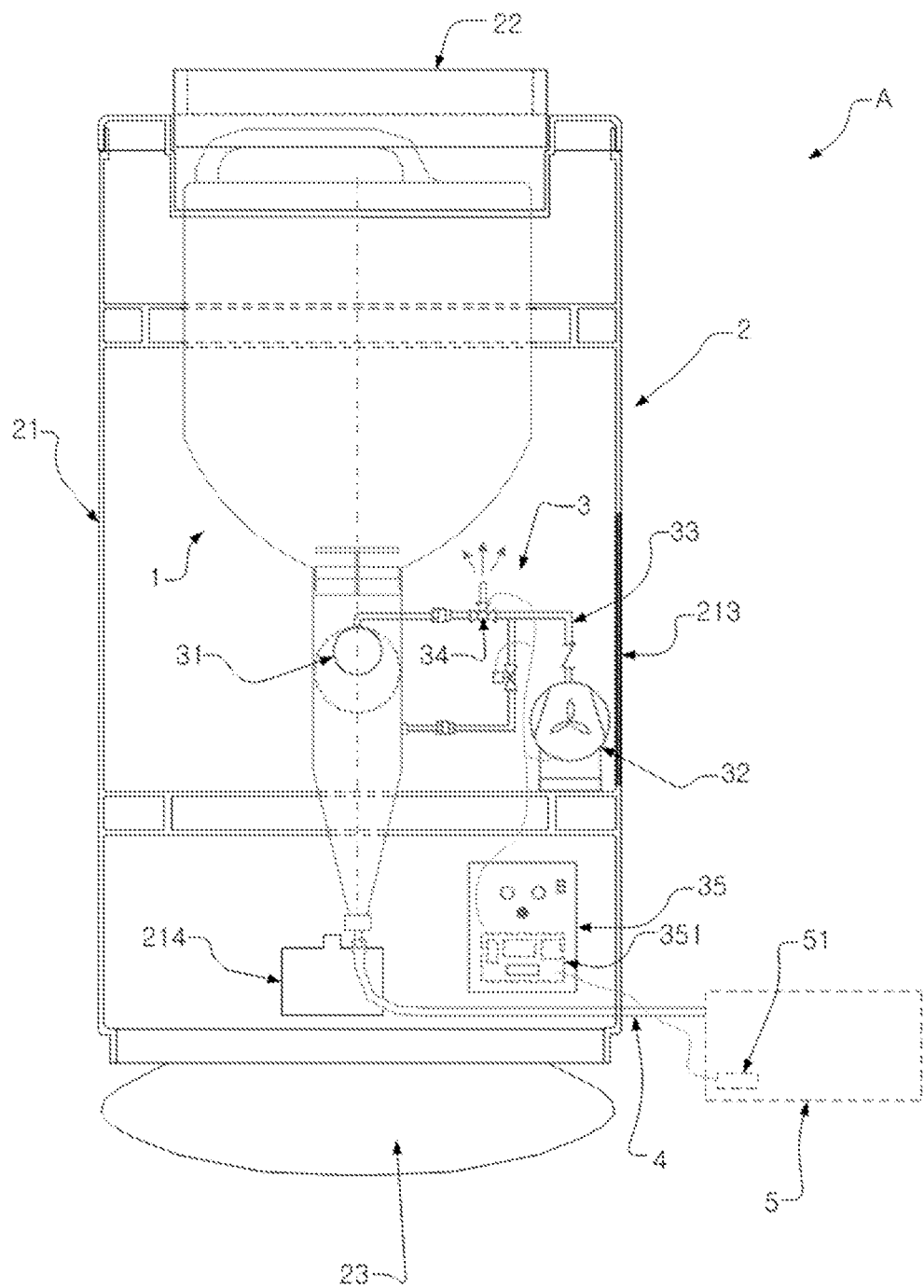
FIG. 1 is a front view of a black and white toner supply device according to a device for automatically toner into a toner cartridge of the present invention.

First, before detailed descriptions of the present invention, detailed descriptions related to well-known functions or configurations will be ruled out in order not to unnecessarily obscure subject matters of the present invention.

Also, Further, the following terms are defined in consideration of the functionality in the present disclosure, and may vary according to the intention of a user or an operator, usage, and so forth. Therefore, the definition should be made on the basis of the overall content of the present specification which discloses "Device for automatically supplying toner to toner cartridge".

Provided is an automatic toner supply device A for automatically supplying toner into a toner cartridge of a laser printer or copy machine.

The automatic toner supply device A for supplying only black toner that is used for a black laser printer or black copy machine includes: a toner storage container 1 for storing toner to be refilled; an outer container 2 accommodating the toner storage container 1; a toner supply unit 3 for supplying the toner stored in the toner storage container 1 into a toner cartridge 5; and a toner supply hose 4 connected to a lower portion of the toner storage container 1 to transfer the toner into the toner cartridge 5 by using the toner supply unit 3.

The toner supply unit 3 includes: a balloon 31 that is expanded or contracted when air is supplied to or discharged from the inside thereof to push toner toward a cartridge or supplement lower toner with upper toner; an air pump 32 for supplying air into the balloon 31; an air pipe 33 for connecting the balloon 31 to the air pump 32; a control valve disposed in the air pipe 33 to supply the air discharged from the air pump 32 into the balloon 31 or discharge the air within the balloon 31; and a control part 35 for receiving a signal transmitted from the toner cartridge 5 and including a controller 351 for controlling an operation of the air pump 32 and operating the control valve 34.

The control valve 34 may be a 3-way valve. Also, the control valve 34 may have a structure that injects air into the balloon 31 or discharge air within the balloon 31 according to a signal of the controller 351. Also, a low sensor 51 is provided in the toner cartridge 5. Thus, when shortage of the toner is detected, the balloon 31 may be repeatedly expanded and contracted by a number that is initially input in the controller 351 to supply the toner into the toner cartridge 5.

Also, an air injection hole 123 through which a portion of the air discharged from the air pump 32 is injected is defined in a lower portion of a guide 12. Also, an air injection pipe 331 branched from the discharge-side air pipe 33 of the air pump 32 and connected to the air injection hole 123 is defined in the lower portion of the guide 12. An electrical valve 3311 is disposed in the air injection pipe 331 to supply the toner into the toner cartridge 5 due to an air pressure generated by injecting air into a lower portion of the toner storage container 1 when the balloon 31 is expanded. The electrical valve 3311 is opened or closed by the signal of the controller 351.

The outer container 2 includes a body 21 constituting a frame thereof, a cap 22 for opening or closing an upper portion thereof, and a support 23 for supporting the body 21.

The toner storage container 1 includes a main body 11 in which most of toner is stored and the guide 12 coupled to a lower portion of the main body 11 and disposed within the balloon 31. Here, the guide 12 has a lower portion including a cone 121 angled at an angle greater than an angle of repose of the toner so that the toner is easily moved downward and a lower portion having a cylindrical shape. Thus, the toner disposed within a lower portion of the balloon 31 may be inserted into the guide 12 by the expansion of the balloon 31.

A supplement hole 111 through which the toner is capable of being supplemented is defined in an upper portion of the main body 11. Also, a handle 112 for opening the cap 22 to take the toner storage container out is disposed on the upper portion of the main body 11.

A toner discharge hole 122 through which the toner is supplied into the toner cartridge 5 is defined in a lower portion of the guide 12.

The main body 11 of the toner storage container 1 may be replaced with a new main body when the toner to be refilled is exhausted. The lower portion of the main body 11 may be screw-coupled to the upper portion of the guide. A cap 113 for preventing the toner from leaking is disposed on a lower end of the main body 11. When the main body 11 is screw-coupled to the guide 12, the cap 113 of the main body 11 is lifted to discharge the toner within the main body 11 downward.

Hereinafter, the present invention will be described in detailed with reference to the drawings.

Figure 2:
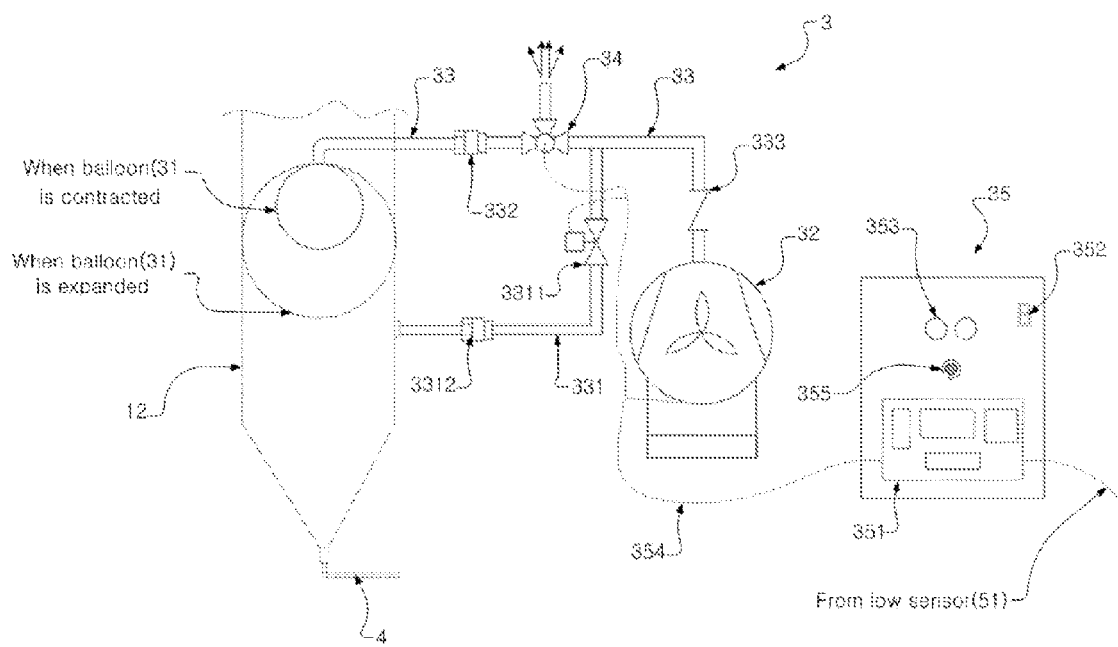
FIG. 2 is a P&I view illustrating a toner supply unit of the black and white toner supply device according to the device for automatically toner into the toner cartridge of the present invention.
Figure 3:
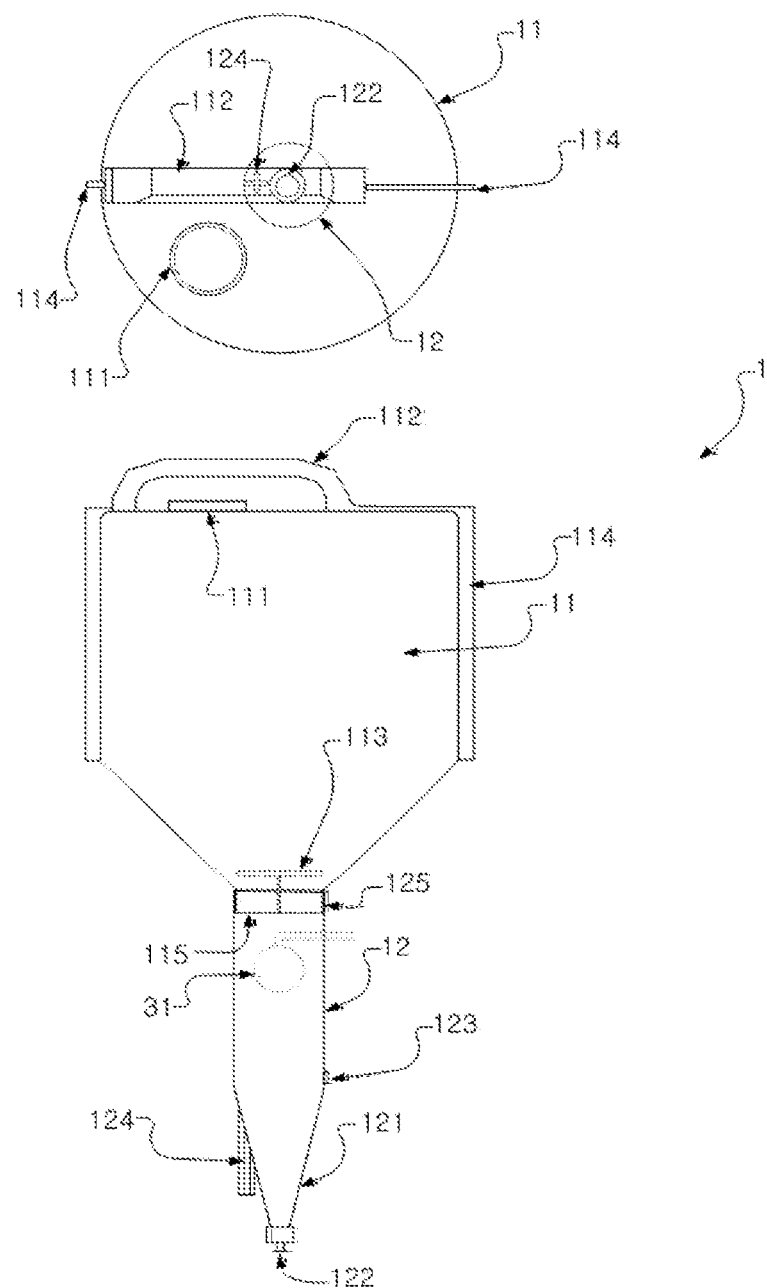
FIG. 3 is a schematic view illustrating a toner storage tank of the black and white toner supply device according to the device for automatically toner into the toner cartridge of the present invention.
Figure 4:
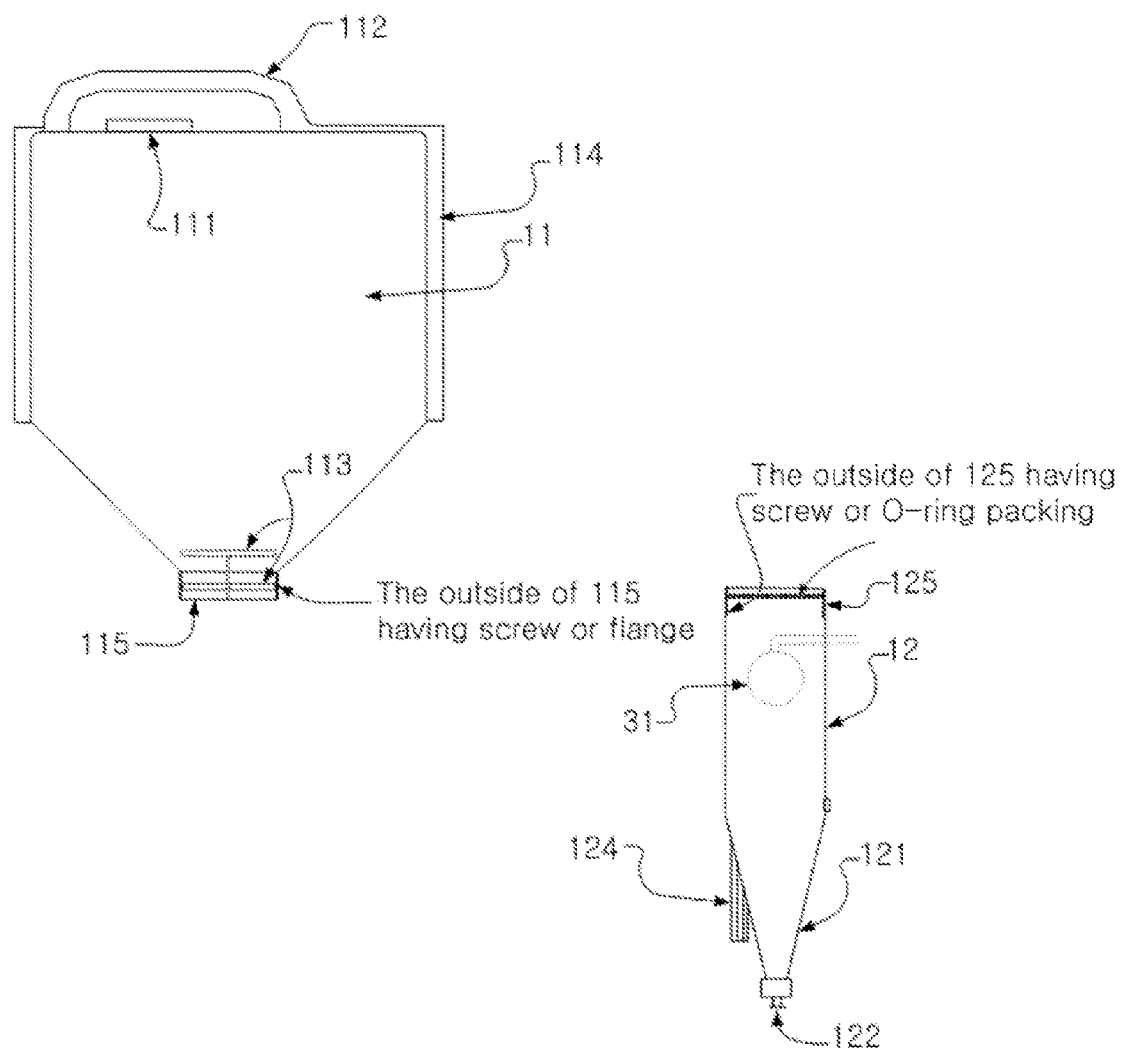
FIG. 4 is a schematic view illustrating a male body and guide separation of the toner storage tank of the black and white toner supply device according to the device for automatically toner into the toner cartridge of the present invention.
Figure 5:
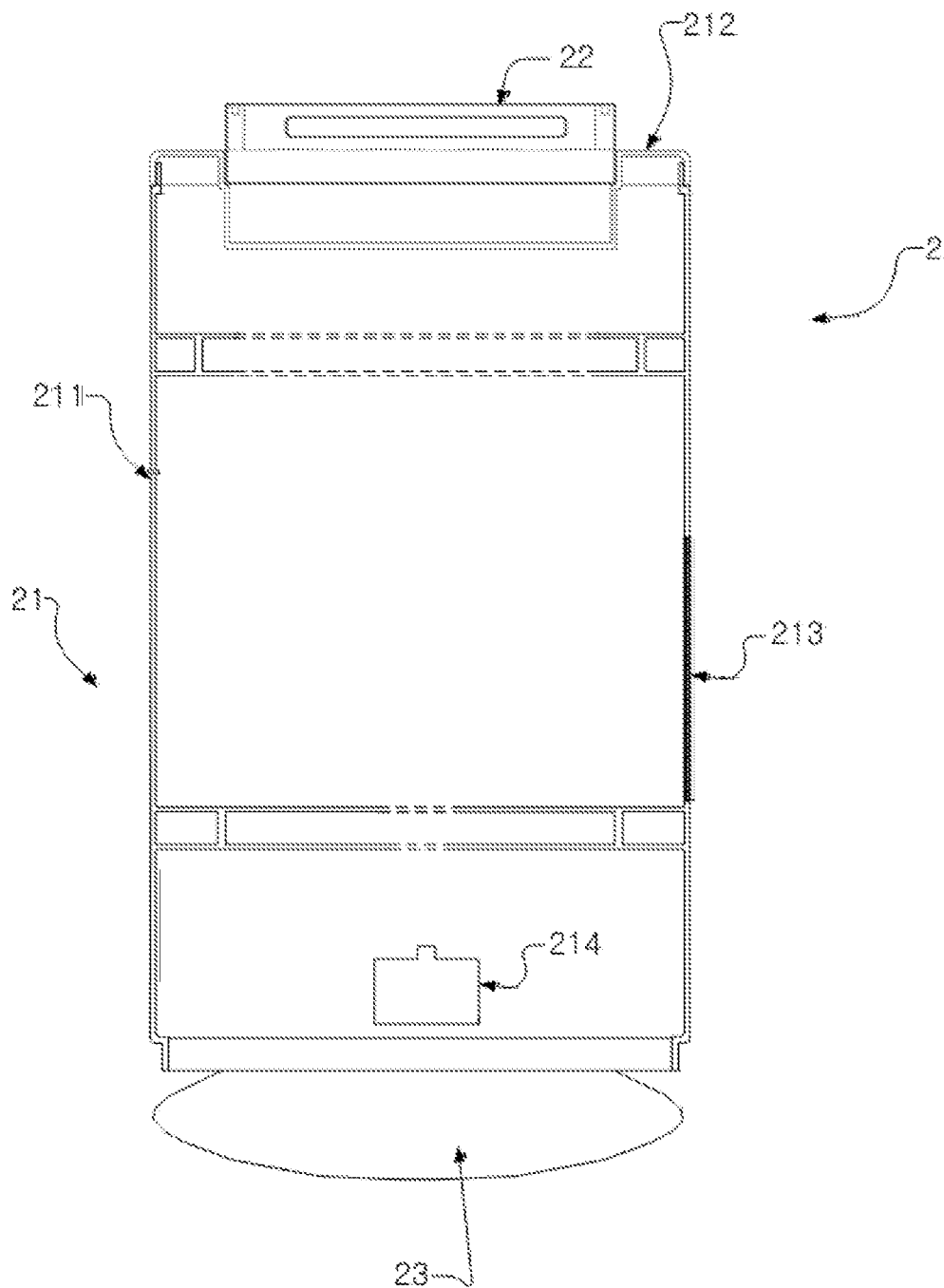
FIG. 5 is a schematic view illustrating an outer container of the black and white toner supply device according to the device for automatically toner into the toner cartridge of the present invention.
Figure 6:
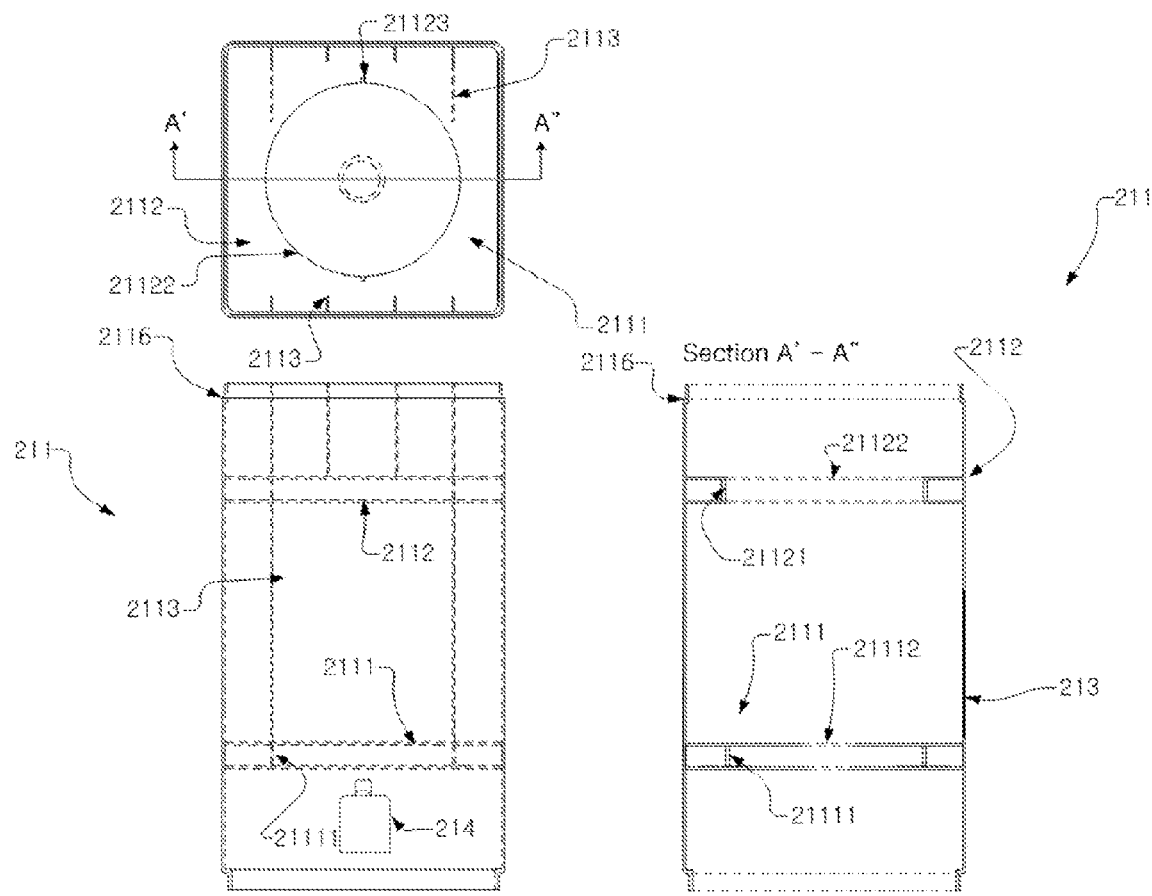
FIG. 6 is a detailed view illustrating a main body of the outer container according to the device for automatically toner into the toner cartridge of the present invention.
Figure 7:
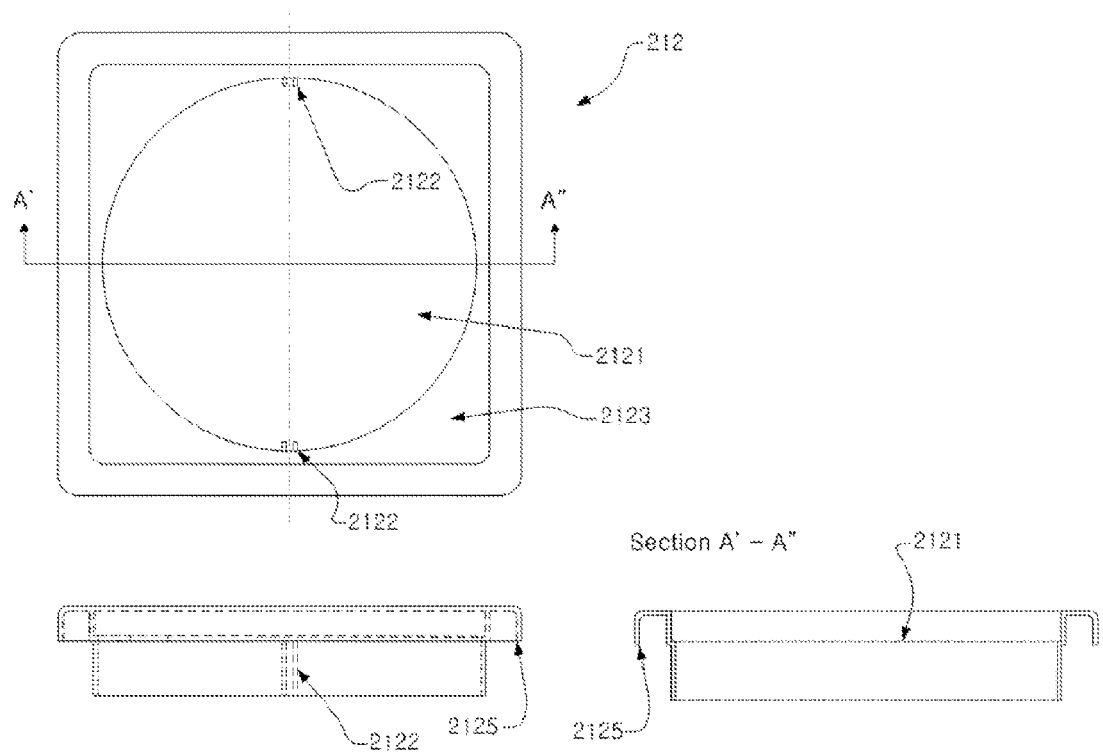
FIG. 7 is a detailed view illustrating an upper body of the outer container of the black and white toner supply device according to the device for automatically toner into the toner cartridge of the present invention.
Figure 8:
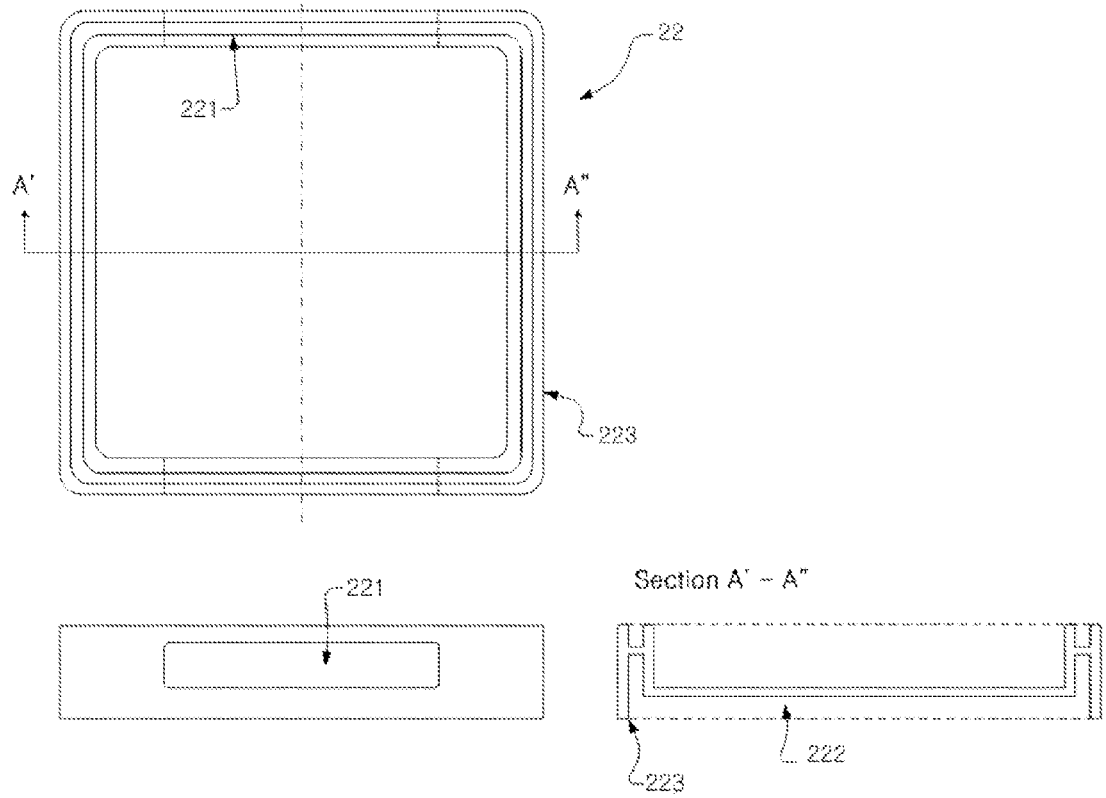
FIG. 8 is a detailed view illustrating a cap of the black and white toner supply device according to the device for automatically toner into the toner cartridge of the present invention.
Figure 9:
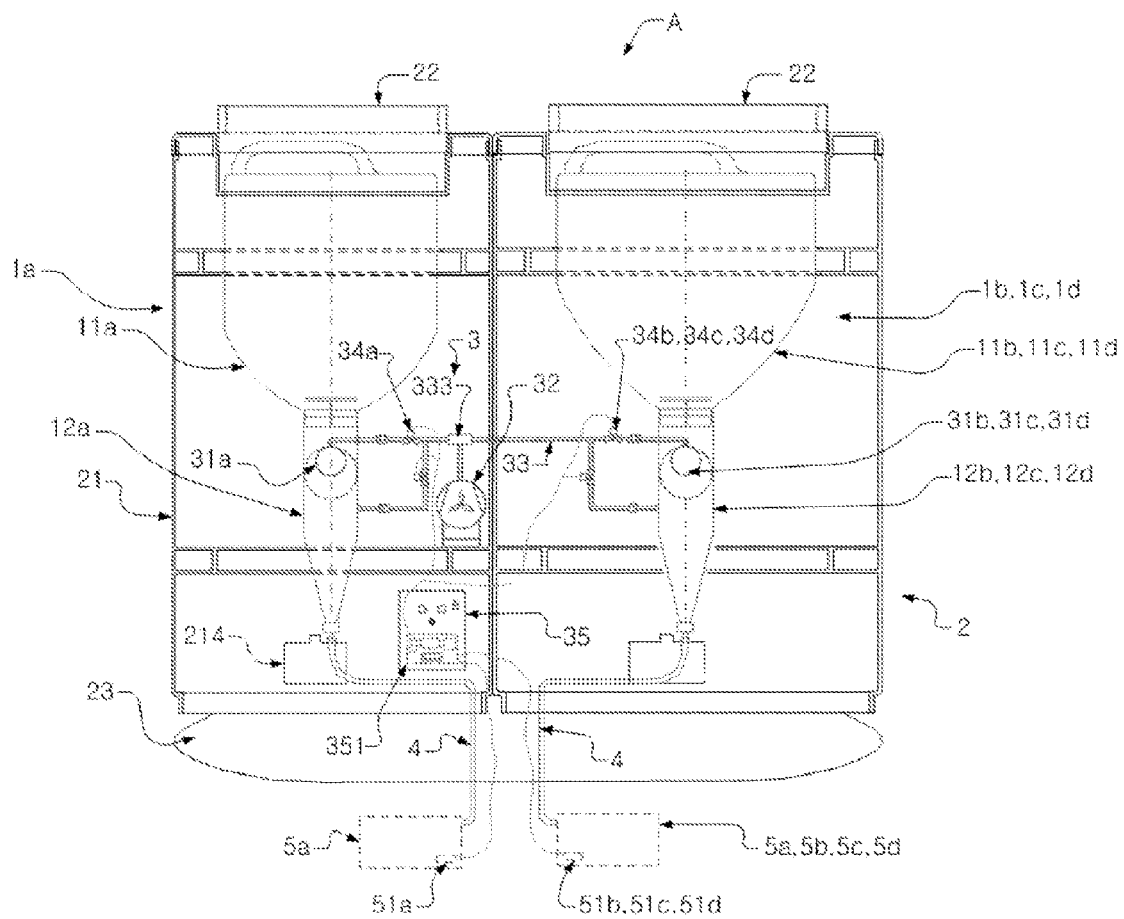
FIG. 9 is a front view of a color toner supply device according to the device for automatically toner into a toner cartridge of the present invention.
Figure 10:
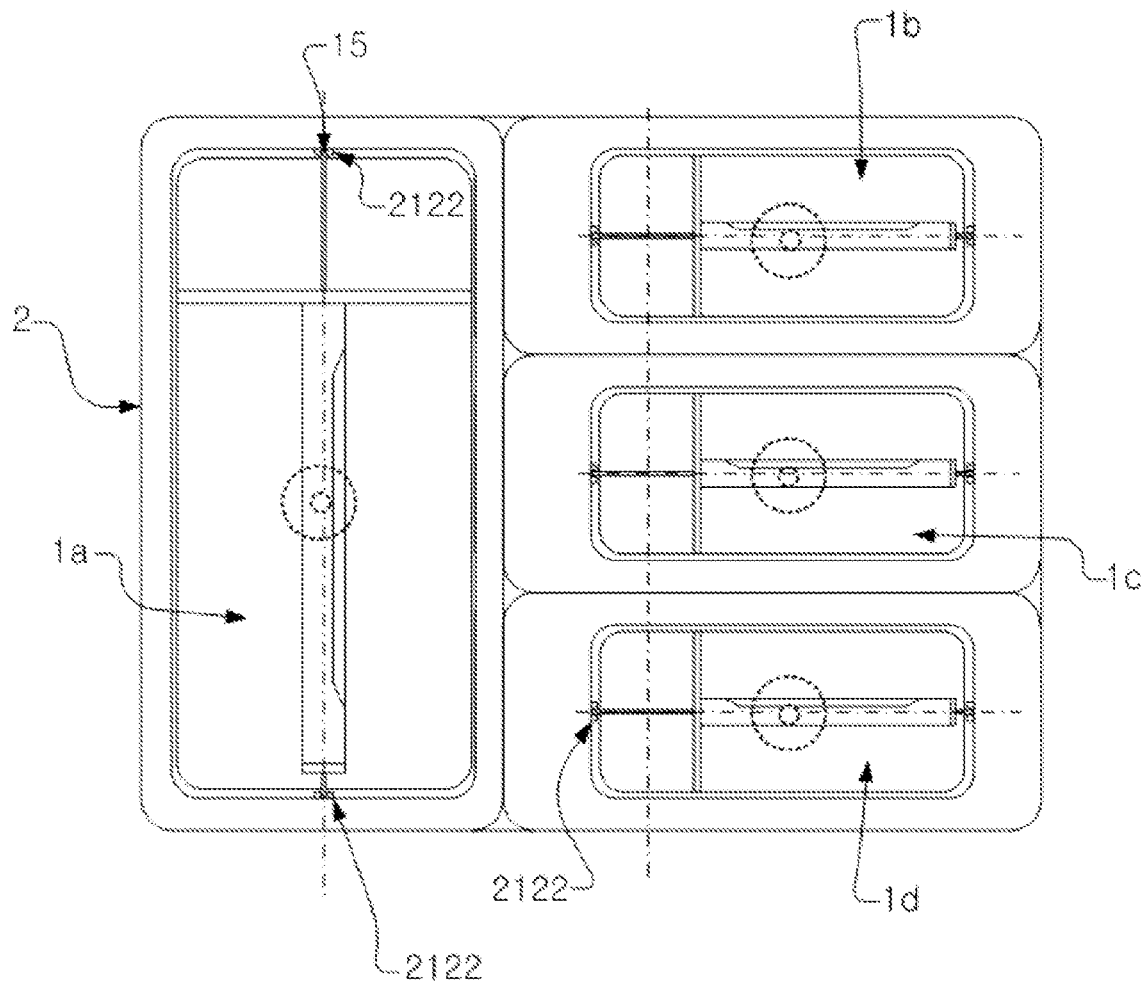
FIG. 10 is a plan view of the color toner supply device according to the device for automatically toner into a toner cartridge of the present invention.
Figure 11:
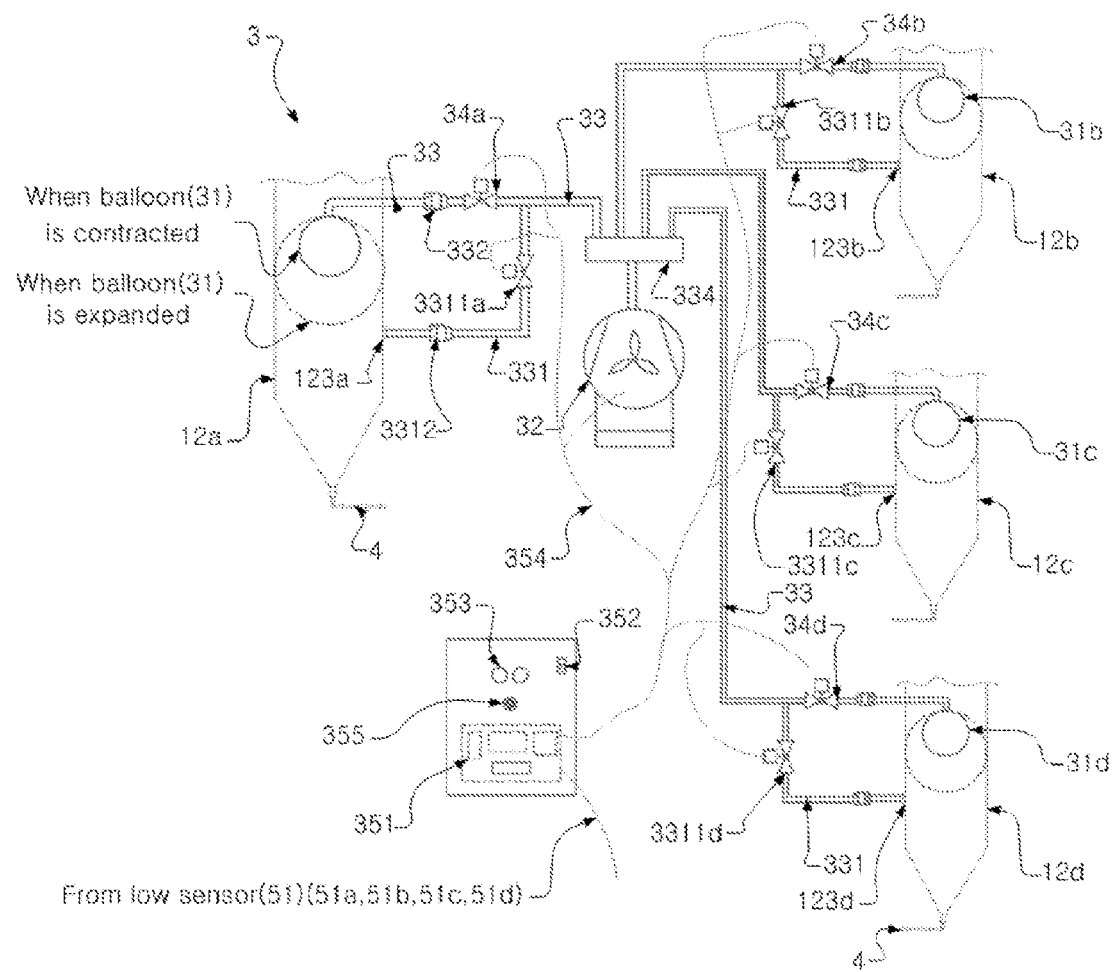
FIG. 11 is a P&I view illustrating the color toner supply device according to the device for automatically toner into the toner cartridge of the present invention.

FIG. 1 is a front view of a black and white toner supply device according to a device for automatically toner into a toner cartridge of the present invention, FIG. 2 is a P&I view illustrating a toner supply unit of the black and white toner supply device according to the device for automatically toner into the toner cartridge of the present invention, FIG. 3 is a schematic view illustrating a toner storage tank of the black and white toner supply device according to the device for automatically toner into the toner cartridge of the present invention, FIG. 4 is a schematic view illustrating a male body and guide separation of the toner storage tank of the black and white toner supply device according to the device for automatically toner into the toner cartridge of the present invention, FIG. 5 is a schematic view illustrating an outer container of the black and white toner supply device according to the device for automatically toner into the toner cartridge of the present invention, FIG. 6 is a detailed view illustrating a main body of the outer container according to the device for automatically toner into the toner cartridge of the present invention, FIG. 7 is a detailed view illustrating an upper body of the outer container of the black and white toner supply device according to the device for automatically toner into the toner cartridge of the present invention, FIG. 8 is a detailed view illustrating a cap of the black and white toner supply device according to the device for automatically toner into the toner cartridge of the present invention, FIG. 9 is a front view of a color toner supply device according to the device for automatically toner into a toner cartridge of the present invention, FIG. 10 is a plan view of the color toner supply device according to the device for automatically toner into a toner cartridge of the present invention, and FIG. 11 is a P&I view illustrating the color toner supply device according to the device for automatically toner into the toner cartridge of the present invention Referring to FIGS. 1 and 2, the automatic toner supply device A for supplying only black toner that is used for a black laser printer or black copy machine includes: a toner storage container 1 for storing toner to be refilled; an outer container 2 accommodating the toner storage container 1; a toner supply unit 3 for supplying the toner stored in the toner storage container 1 into a toner cartridge 5; and a toner supply hose 4 connected to a lower portion of the toner storage container 1 to transfer the toner into the toner cartridge 5 by using the toner supply unit 3.

The toner supply unit 3 includes: a balloon 31 that is expanded or contracted when air is supplied to or discharged from the inside thereof to push toner toward a cartridge or supplement lower toner with upper toner; an air pump 32 for supplying air into the balloon 31; an air pipe 33 for connecting the balloon 31 to the air pump 32; a control valve 34 disposed in the air pipe 33 to supply the air discharged from the air pump 32 into the balloon 31 or discharge the air within the balloon 31; and a control part for receiving a signal transmitted from the toner cartridge 5 and including a controller 351 for controlling an operation of the air pump 32 and operating the control valve 34. A check valve 333 is disposed in the air pipe 33 to prevent the air from flowing backward when the operation of the air pump 32 is stopped. Also, a connection adaptor 332 may be disposed in the air pipe 33 to easily connect the air pipe 33 to the balloon 31.

The balloon 31 is formed of a special silicon rubber that is not aged or torn even though the balloon 31 is expanded and contracted innumerably.

The control valve 34 may be a 3-way valve. Also, the control valve 34 may have a structure that injects air into the balloon 31 or discharge air within the balloon 31 according to a signal of the controller 351. While air is injected into the balloon 31, a discharge-side passage is closed. Also, when the balloon 31 is contracted, the passage is formed toward the outside so that the air is discharged to the outside.

A low sensor 51 is provided in the toner cartridge 5. Thus, when shortage of the toner is detected, the balloon 31 may be repeatedly expanded and contracted by numbers that are initially input in the controller 351 to supply the toner into the toner cartridge 5.

An air injection pipe 331 branched from the discharge-side air pipe 33 and connected to an air injection hole 123 is disposed. An electrical valve 3311 is disposed in the air injection pipe 331 to supply the toner into the toner cartridge 5 due to an air pressure generated by injecting air into a lower portion of the toner storage container 1 when the balloon 31 is expanded. The electrical valve 3311 is opened or closed by the signal of the controller 351. Also, a connection adaptor 332 may be disposed in the air pipe 33 to easily connect the air pipe 33 to the balloon 31.

The control part 35 may include parts for controlling, such as the controller 351 for controlling an operation of the air pump 32 and operating the control valve 34, a power switch 352 for supplying power into the toner supply unit 3, an operation button 355, a state display lamp 353, and a control line 354. Thus, since the control part 35 is the well-known technology, its detailed description will be omitted.

That is, when the shortage of the toner is detected by the low sensor 51 disposed in the toner cartridge 5, toner low of the state display lamp 353 is lighted to automatically operate the toner supply unit. In a state where the low sensor 51 is not disposed in the toner cartridge 5, when the shortage of the toner is recognized through a printed paper, the operation button 355 disposed on the toner supply unit 3 is pushed to repeatedly expand and contract the balloon 31 by numbers (generally, about 5 times to about 5 times) that is initially input in the controller 351, thereby supplying the toner stored in the toner storage container 1 into the toner cartridge 5 through a toner supply hose 4. However, the present invention is not limited to the automatic toner supply or the automatic toner supply through the pushing of the operation button 355.

According to core aspects of the present invention, the balloon 31 is repeatedly expanded and contracted to push the toner into the cartridge due to a volume change through the expansion and contraction, like a piston within a cylinder, the reception of the toner into the guide 12 is repeatedly performed, and air is injected by the operation of the air pump 32 to expand the balloon 31, thereby injecting the toner into the toner cartridge 5. Also, when the injection of the tuber is finished, the valve is opened toward the outside to discharge the air into the outside because of the 3-way control valve 34. Also, the balloon 31 is contracted to supplement the lower toner with the upper toner. Then, the above-described operations are repeatedly performed by the preset numbers (generally, about 5 times to about 6 times). Here, operation numbers, an air pump operation and stopping time, a control valve operation time, and an electrical valve opening time, and the like may be set through numbers of experiments to input the resultant data into the controller 351. As a result, the toner supply unit may be operated by the input data.

The electrical valve 3311 disposed in the air injection pipe 331 to assist injection of air is opened to inject air into the guide 12. Here, since the air is injected into the guide 12 in a state where the upper portion of the toner cartridge 5 is blocked by the balloon 31, the toner may be easily injected into the toner cartridge 5.

When the toner supply hose 4 has a long length of about 50 cm or more, it is difficult to fully supply the toner through only the expansion of the balloon 31. Thus, when the air is additionally injected into the guide 12 through the air injection pipe 331 during the expansion of the balloon 31, even though the toner supply hose 4 has a long length of about 100 cm, the toner may be smoothly supplied. This may be confirmed through numbers of experiments.

Referring to FIGS. 3 and 4, the toner storage container 1 that is used for a black laser printer or black copy machine includes a main body 11 in which most of toner is stored and the guide 12 coupled to a lower portion of the main body 11 and disposed within the balloon 31. Here, the guide 12 has a lower portion including a cone 121 angled at an angle greater than an angle of repose of the toner so that the toner is easily moved downward and a lower portion having a cylindrical shape. Thus, the toner disposed within a lower portion of the balloon 31 may be inserted into the guide 12 by the expansion of the balloon 31.

A supplement hole 111 through which the toner is capable of being supplemented is defined in an upper portion of the main body 11. Also, a handle 112 for opening the cap 22 to take the toner storage container out is disposed on the upper portion of the main body 11.

A guide coupling part 115 coupled to the guide 12 is disposed on a lower portion of the main body 11. An outer surface of the guide coupling part 115 may have a threaded shape. Alternatively, the guide coupling part 115 may have a cylindrical shape in which a packing groove is defined so that an O-ring packing is inserted when the guide coupling part 115 is directly inserted downward.

A toner discharge hole 122 through which the toner is supplied into the toner cartridge 5 is defined in a lower portion of the guide 12.

A main body coupling part 125 coupled to the guide coupling part 115 of the main body 11 is disposed on a lower portion of the guide 12. A thread or O-ring packing may be disposed in an inner surface of the main body coupling part 125. Thus, the main body 11 may be screw-coupled to the main body coupling part 125, or the main body 11 may be pushed downward and thus coupled to the main body coupling part 125.

The main body 11 of the toner storage container 1 may be replaced with a new main body when the toner to be refilled is exhausted. The lower portion of the main body 11 may be screw-coupled to the upper portion of the guide. Alternatively, an O-ring packing may be disposed inside the main body coupling part 125 of the guide 12 to prevent the toner from leaking by the O-ring packing when the guide coupling part 115 is inserted.

A cap 113 for preventing the toner from leaking downward is disposed on a lower end of the main body 11. That is, when the main body 11 is screw-coupled or pushed downward and thus inserted, the cap 113 of the main body 11 may be lifted to prevent the toner from leaking downward.

When the guide 12 and the main body 11 are coupled to each other, the cap 113 of the main body 11 may be opened by using a method in which an adaptor including the cap 113 is fitted into the guide coupling part 115 of the main body 11 to lift the cap 113 through a tension of a spring attached to the guide 12.

An air injection hole 123 through which a portion of air discharged from the air pump 32 is injected is defined in a lower portion of the guide 12. Also, an air injection pipe 331 is branched from the discharge-side air pipe 33 of the air pump 32 and connected to the air injection hole 123.

Two insertion protrusions 114 inserted into the body 21 of the outer container 2 in a predetermined direction is symmetrically disposed in a length direction of the toner storage container 1. A support bar 124 for supporting a portion of a load of a toner refill storage tank is disposed on a lower portion of the toner storage container 1. The support bar 124 may be placed on a protruding portion of a lower portion of the body 211 to share the load with a lower reinforcing plate opening 21112.

However, in the structure in which the main body 11 of the toner storage container 1 and the guide 12 are screw-coupled to each other, the components such as the insertion protrusions 114 or guide protrusions 2122 are not required.

Referring to FIG. 5, the outer container for supplying the black toner that is used in the black and white laser printer or the black and white copy machine includes a body 21 constituting a frame thereof and a cap 22 for opening or closing an upper portion thereof, and a support 23 for supporting the body 21.

The body 21 includes a main body 211 inserted and seated into the toner storage container 1 and including the toner supply unit 3 therein and an upper body 212 on which the cap 22 is placed and coupled to an upper portion of the main body 211.

Referring to FIG. 6, the main body 211 for supplying only black toner that is used in the black and white laser printer or the black and white copy machine may be injection-molded. The main body 211 may be provided in two parts that are coupled to each other. That is, the main body 211 is divided along line A-A' (a red line) in section.

To easily injection-mold the main body 211, the main body 211 may be bisectionally divided. Here, the divided main bodies 211 may be reinforced by using a reinforcing rib. Also, since the main body 211 is divided in two parts, the control mechanism may be easily installed therein.

The bisectionally divided main bodies 211 may be coupled to each other by pushing one main body 211 through a one-touch coupling method.

A lower reinforcing plate 2111 on which a cone 121 that is a lower portion of the toner storage container 1 is seated, an upper reinforcing plate 2112 for guiding the insertion of the toner storage container 1, and a reinforcing rib 2113 for reinforcing the main body 211 are disposed within the main body 211.

First and second checking windows 213 and 214 for checking and confirming the toner supply unit 3 disposed within the main body 211 and a lower portion of the toner storage container 1 may be disposed in an outer portion of the main body 211.

The lower reinforcing plate 2111 may be constituted by two plates. A vertical reinforcing frame 21111 for reinforcing is disposed between the two plates. A lower reinforcing plate opening 21112 in which the toner storage container 1 is inserted is defined in the lower reinforcing plate 2111.

The lower reinforcing plate opening 21112 forms the cone 121 that has a diameter gradually decreasing downward so that the guide 12 of the toner storage container 1 has a hopper shape (an inverse conical shape). Also, since the two plates has opening sizes different from each other, a degree of slope of the cone 121 should be equal to that of the lower reinforcing plate opening 21112 so that a uniform force is applied to the toner storage container 1 and the toner storage container 1 is precisely seated on the two plates.

The upper reinforcing plate 2112 may be constituted by two plates. A vertical reinforcing frame 21121 for reinforcing is disposed between the two plates. An upper reinforcing plate opening 21122 in which the toner storage container 1 is inserted and seated and a guide groove 21123 by which the toner storage container 1 is inserted in a predetermined direction are defined in the upper reinforcing plate 2112.

However, in the structure in which the main body 11 of the toner storage container 1 and the guide 12 are screw-coupled to each other, the guide groove 21123 is not required.

In the upper reinforcing plate opening 21122 in which the toner storage container 1 is inserted and seated, the two plates may be opened with the same diameter, unlike the lower reinforcing plate opening 21112.

Referring to FIG. 7, the upper body 212 for supplying only black toner that is used in the black and white laser printer or the black and white copy machine is fitted into an upper body seating protrusion 2116 of the main body 211 to insert the toner storage container 1 therein.

The upper body 212 includes an upper body opening part 2121 in which the toner storage container 1 is inserted, a guide protrusion 2122 inserted in a predetermined direction when the toner storage container 1 is inserted into the upper body opening 2121, and a main body coupling part 2125 seated on a cap seating part 2123 on which the cap 22 is placed and the upper body seating protrusion 2116 of the main body 211.

When the insertion protrusion 114 of the toner storage container is inserted into the guide protrusion 2122 and then the toner storage container 1 is inserted downward, the guide protrusion 2122 may guide the insertion of the toner storage container 1.

On the other hand, in the structure in which the main body 11 of the toner storage container 1 and the guide 12 are screw-coupled to each other, the components such as the insertion protrusions 114 or the guide protrusions 2122 are not required.

Referring to FIG. 8, the cap 22 for supplying only black toner that is used in the black and white laser printer or the black and white copy machine includes two symmetrical cap handle grooves 221 used for opening the cap 22. An upper body insertion part 223 is closely seated on the cap seating part 2123 of the upper body 212 to define a space part 222.

Referring to FIGS. 9 and 10, an automatic toner supply device A for automatically supplying toner into a color laser printer or a color toner cartridge of a color copy machine is provided.

The automatic toner supply device A for automatically supplying toner into the color toner cartridge includes: a black toner storage container 1a for storing black toner to be refilled; a red toner storage container 1b for storing red toner to be refilled; a blue toner storage container 1c for storing blue toner to be refilled; a yellow toner storage container 1d for storing yellow toner to be refilled; an outer container 2 for accommodating the black toner storage container 1a, the red toner storage container 1b, the blue toner storage container 1c, and the yellow toner storage container 1d; a toner supply unit 3 for respectively supplying the toner stored in the black toner storage container 1a, the red toner storage container 1b, the blue toner storage container 1c, and the yellow toner storage container 1d into black, red, blue, and yellow toner cartridges 5a, 5b, 5c, and 5d; and a toner supply hose 4 connected to lower portions of the black, red, blue, and yellow toner storage containers 1a, 1b, 1c, and 1d to respectively transfer the black, red, blue, and yellow toner into the black, red, blue, and yellow toner cartridges 5a, 5b, 5c, and 5d by the toner supply unit 3.

The toner supply unit 3 includes: balloons 31a, 31b, 31c, and 31d that are expanded or contracted when air is supplied to or discharged from the inside thereof to push the toner toward the cartridges or supplement lower toner with upper toner; an air pump 32 for supplying air into the balloons 31a, 31b, 31c, and 31d; an air pipe 33 for connecting the balloons 31a, 31b, 31c, and 31d to the air pump 32; a control part 35 including a controller 351 receiving signals transmitted from the black, red, blue, and yellow toner cartridges 5a, 5b, 5c, and 5d to control the toner supply unit 3.

The air pump 32 may be disposed on each of the balloons 31a, 31b, 31c, and 31d, or one air distributor 334 may be disposed on a rear end of the air pump 32 to distribute air.

The outer container 2 includes a main body 21 constituting a frame thereof, a cap 22 for opening or closing an upper portion thereof, and a support 23 for supporting the main body 21.

The black, red, blue, and yellow toner storage containers 1a, 1b, 1c, and 1d include main bodies 11a, 11b, 11c, and 11d in which most of toner is stored; and guides 12a, 12b, 12c, and 12d coupled to lower portions of the main bodies 11a, 11b, 11c, and 11d and disposed within the balloons 31a, 31b, 31c, and 31d, respectively. Each of the guides 12a, 12b, 12c, and 12d has a lower portion including a cone 121 angled at an angle greater than an angle of repose of each of the toner. Thus, the toner disposed within lower portions of the balloons 31a, 31b, 31c, and 31d may be inserted into the guides 12a, 12b, 12c, and 12d by the expansion of the balloons 31a, 31b, 31c, and 31d, respectively.

A supplement hole 111 through which the toner is capable of being supplemented is defined in an upper portion of each of the main bodies 11a, 11b, 11c, and 11d. Also, a handle 112 for opening the cap 22 to take the toner storage container out is disposed on the upper portion of each of the main bodies 11a, 11b, 11c, and 11d.

A toner discharge hole 122 through which the toner is supplied into each of the black, red, blue, and yellow toner cartridges 5a, 5b, 5c, and 5d is defined in a lower portion of each of the guides 12a, 12b, 12c, and 12d.

The main bodies 11a, 11b, 11c, and 11d of the black, red, blue, and yellow toner storage containers 1a, 1b, 1c, and 1d may be replaced with new main bodies 11a, 11b, 11c, and 11d when the toner to be refilled is exhausted, respectively. A cap 113 for preventing the toner from leaking downward is disposed on a lower end of each of the main bodies 11a, 11b, 11c, and 11d.

When the main bodies 11a, 11b, 11c, and 11d are respectively coupled to the guides 12a, 12b, 12c, and 12d, the cap 113 of each of the main bodies 11a, 11b, 11c, and 11d may be lifted to discharge the toner within the main bodies 11a, 11b, 11c, and 11d downward.

Low sensors 51a, 51b, 51c, and 51d are disposed in the black, red, blue, and yellow toner cartridges 5a, 5b, 5c, and 5d, respectively. Thus, when the shortage of the toner is detected, the balloons 31a, 31b, 31c, and 31d may be expanded or contracted by numbers that are initially input in the controller 351 to supply the toner into the black, red, blue, and yellow toner cartridges 5a, 5b, 5c, and 5d, respectively.

The automatic toner supply device A for automatically supplying toner into the color toner cartridge has the same operation principle as the automatic toner supply device A for automatically supplying only black toner that is used in the black and white laser printer or the black and white copy machine. Also, the toner storage containers 1a, 1b, 1c, and 1d and the outer container 2 may be equal or similar to those of the automatic toner supply device A for automatically supplying only black toner that is used in the black and white laser printer or the black and white copy machine. Thus, since the automatic toner supply device A is described in detail in the descriptions with respect to the automatic toner supply device A for automatically supplying only black toner that is used the black and white laser printer or the black and white copy machine, detailed descriptions with respect to the automatic toner supply device A for automatically supplying toner into the color toner cartridge except for only several descriptions will be omitted.

In the automatic toner supply device A for automatically supplying toner into the color toner cartridge, the black, red, blue, and yellow toner storage containers 1a, 1b, 1c, and 1d include main bodies 11a, 11b, 11c, and 11d in which most of toner is stored; and guides 12a, 12b, 12c, and 12d coupled to lower portions of the main bodies 11a, 11b, 11c, and 11d and disposed within the balloons 31a, 31b, 31c, and 31d, respectively. Each of the guides 12a, 12b, 12c, and 12d has a lower portion including a cone 121 angled at an angle greater than an angle of repose of each of the toner. Thus, the toner disposed within lower portions of the balloons 31a, 31b, 31c, and 31d may be inserted into the guides 12a, 12b, 12c, and 12d by the expansion of the balloons 31a, 31b, 31c, and 31d, respectively.

A supplement hole 111 through which the toner is capable of being supplemented is defined in an upper portion of each of the main bodies 11a, 11b, 11c, and 11d. Also, a handle 112 for opening the cap 22 to take the toner storage container out is disposed on the upper portion of each of the main bodies 11a, 11b, 11c, and 11d. A toner discharge hole 122 through which the toner is supplied into each of the black, red, blue, and yellow toner cartridges 5a, 5b, 5c, and 5d is defined in a lower portion of each of the guides 12a, 12b, 12c, and 12d.

A guide coupling part 115 coupled to each of the guides 12a, 12b, 12c, and 12d is disposed on a lower portion of each of the main bodies 11a, 11b, 11c, and 11d. The guide coupling part 115 may have a cylindrical outer shape having a packing groove in which an O-ring packing is inserted when the guide coupling part 115 is directly inserted downward. Each of the main bodies 11a, 11b, 11c, and 11d serving as the color toner storage containers may have an upper portion having a square pillar shape. At this time, the four storage containers may be easily disposed on the main bodies 11a, 11b, 11c, and 11d, respectively.

A main body coupling part 125 coupled to the guide coupling part 115 of each of the main bodies 11a, 11b, 11c, and 11d is disposed on a lower portion of each of the guides 12a, 12b, 12c, and 12d. An O-ring packing may be disposed inside the main body coupling part 125 to couple each of the main bodies 11a, 11b, 11c, and 11d to the main body coupling part 125 by pushing the main bodies 11a, 11b, 11c, and 11d downward. The O-ring packing of each of the guides 12a, 12b, 12c, and 12d and the packing groove of each of the main bodies 11a, 11b, 11c, and 11d may be exchanged in position.

The main bodies 11a, 11b, 11c, and 11d of the black, red, blue, and yellow toner storage containers 1a, 1b, 1c, and 1d may be replaced with new main bodies 11a, 11b, 11c, and 11d when the toner to be refilled is exhausted, respectively. Here, a lower portion of each of the main bodies 11a, 11b, 11c, and 11d and an upper portion of the guides 12a, 12b, 12c, and 12d may be coupled to each other. Also, since the O-ring packing is disposed inside the main body coupling part 125 of each of the guides 12a, 12b, 12c, and 12d. Thus, when the guide coupling part 115 is inserted, the leakage of the toner may be prevented by the O-ring packing.

A cap 113 for preventing the toner from leaking downward is disposed on a lower end of each of the main bodies 11a, 11b, 11c, and 11d. That is, when the main bodies 11a, 11b, 11c, and 11d are screw-coupled or pushed downward and thus inserted, the cap 113 of each of the main bodies 11a, 11b, 11c, and 11d may be lifted to prevent the toner from leaking downward.

When the guide and the main body are coupled to each other, the cap of the main body may be opened by using a method in which an adaptor including the cap 113 is inserted to lift the cap 113 through a tension of a spring.

When each of the guides 12a, 12b, 12c, and 12d and each of the main bodies 11a, 11b, 11c, and 11d are coupled to each other, the cap 113 of each of the main bodies 11a, 11b, 11c, and 11d may be opened by using a method in which an adaptor including the cap 113 is fitted into the guide coupling part 115 of each of the main bodies 11a, 11b, 11c, and 11d to lift the cap 113 through a tension of a spring attached to each of the guides 12a, 12b, 12c, and 12d.

An air injection hole 123 through which a portion of air discharged from the air pump 32 is injected is defined in a lower portion of each of the guides 12a, 12b, 12c, and 12d. Also, an air injection pipe 331 is branched from the discharge-side air pipe 33 of the air pump 32 and connected to the air injection hole 123.

Two insertion protrusions 114 inserted into the main body 21 of the outer container 2 in a predetermined direction is symmetrically disposed in a length direction of the toner storage container 1. A support bar 124 for supporting a portion of a load of a toner refill storage tank is disposed on a lower portion of the toner storage container 1. The support bar 124 may be placed on a protruding portion of a lower portion of the main body 211 to share the load with a lower reinforcing plate opening 21112.

Referring to FIG. 11, the toner supply unit 3 for automatically supplying toner into the color toner cartridge of a laser printer or copy machine additionally includes control valves 34a, 34b, 34c, and 34d disposed in the air pipe 33 to supply air discharged from the air pump 33 into the balloons 31a, 31b, 31c, and 31d or discharge air within the balloons 31a, 31b, 31c, and 31d by a signal of the controller 351.

Each of the control valves 34a, 34b, 34c, and 34d may be a solenoid valve. The control valves 34a, 34b, 34c, and 34d may be electrically opened or closed by a signal of the controller 351.

Each of air injection holes 123a, 123b, 123c, and 123d through which a portion of air discharged from the air pump 32 is injected is defined in a lower portion of each of the guides 12a, 12b, 12c, and 12d. Also, an air injection pipe 331 is branched from the discharge-side air pipe 33 of the air pump 32 and connected to each of the air injection holes 123a, 123b, 123c, and 123d.

Each of electrical valves 3311a, 3311b, 3311c, and 3311d is disposed in the air injection pipe 331 so that air is injected into a lower portion of each of the black, red, blue, and yellow toner storage containers 1a, 1b, 1c, and 1d to supply toner into each of the black, red, blue, and yellow toner cartridges 5a, 5b, 5c, and 5d by an air pressure after the balloons 31a, 31b, 31c, and 31d are expanded. Here, the electrical valves 3311a, 3311b, 3311c, and 3311d may be opened or closed by a signal of the controller 351.

The air pump 32 may be changed in rotation by a forward and reverse type motor to inject air into the balloons 31a, 31b, 31c, and 31d or discharge air within the balloons 31a, 31b, 31c, and 31d.

The above-described embodiment, the air distributor 334 is disposed in one air pump 32 to supply and discharge air into/from each of the balloons 31a, 31b, 31c, and 31d. Here, the control valves 34a, 34b, 34c, and 34d are needed. For example, when black toner is supplied, the remaining control valves 34b, 34c, and 34d are closed, and only the control valve 34a for black toner is opened to supply air. Also, when the black toner is discharged, only the control valve 34a for black toner is opened to suction air by reversely rotating the air pump 32, thereby discharging the air within the balloon 31a. Thus, the balloon 31a may be contracted to move the upper toner into the guide 12a. This process may be repeatedly performed by preset numbers to supply the black toner into the black toner cartridge 5a.

When the toner supply hose 4 has a long length of about 50 cm or more, it is difficult to fully supply the toner through only the expansion of the balloons 31a, 31b, 31c, and 31d. Thus, when little air is additionally injected through the air injection pipe 331 during the expansion of the balloons 31a, 31b, 31c, and 31d, even though the toner supply hose 4 has a long length of about 100 cm, the toner may be smoothly supplied. This may be confirmed through numbers of experiments.

The air pump 32 may be disposed in each of the balloons 31a, 31b, 31c, and 31d. Here, the control valves may be used, and also, the forward and reverse type air pump 32 may be used to supply or discharge air into/from each of the balloons 31a, 31b, 31c, and 31d.

The toner supply unit 3 for automatically supplying toner into the color toner cartridge may have the same operation principle as the toner supply unit 3 for supplying only black toner that is used in the black and white printer or black and white copy machine. Thus, since the automatic toner supply unit 3 is described in detail in the descriptions with respect to the automatic toner supply unit 3 for automatically supplying only black toner that is used the black and white laser printer or the black and white copy machine, detailed descriptions with respect to the automatic toner supply device 3 for automatically supplying toner into the color toner cartridge will be omitted.

In the device for automatically supplying toner into the toner cartridge according to the present invention, since the active cartridge of the laser print or copy machine is automatically filled with toner without separating the cartridge from the body, there is a convenience that the lacking toner may be filled without separating the toner cartridge from the body. Also, since the main injection method for toner uses a volume change, possibility of malfunction of the toner supply device may be significantly reduced. Also, when the low sensor is used, since suitable toner is always disposed within the cartridge, the shortage of the toner may be prevented to realize stable printing.

The invention claimed is:

1. An automatic toner supply device (A) for automatically supplying toner into a toner cartridge, the automatic toner supply device (A) comprising:
   a toner storage container (1) for storing toner to be refilled;
   an outer container (2) for accommodating the toner storage container (1);
   a toner supply unit (3) for supplying the toner stored in the toner storage container (1) into a toner cartridge (5); and
   a toner supply hose (4) connected to a lower portion of the toner storage container (1) to transfer the toner into the toner cartridge (5) by the toner supply unit (3),
   wherein the toner supply unit (3) comprises:
   a balloon (31) that is expanded or contracted when air is supplied into or discharged from the inside thereof to push lower toner toward the cartridge or supplement the lower toner with upper toner;
   an air pump (32) for supplying air into the balloon (31);
   an air pipe (33) for connecting the balloon (31) to the air pump (32); and
   a control part (35) for receiving a signal transmitted from the toner cartridge (5), the control part (35) comprising a controller (351) controlling the toner supply unit (3).

2. The automatic toner supply device of claim 1, wherein the outer container (2) comprises:
   a body (21) constituting a frame of the outer container (2);
   a cap (22) for opening or closing an upper portion of the outer container (2); and
   a support (23) for supporting the body (21),
   wherein the toner storage container (1) comprises:
   a main body (11) in which most of the toner is stored; and
   a guide (12) coupled to a lower portion of the main body (11) and disposed within the balloon (31), the guide (12) having a lower portion comprising a cone (121) angled at an angle greater than an angle of repose so that the toner is easily moved downward and a cylindrical-shaped upper portion in which the toner within a lower portion of the balloon (31) is inserted by the expansion of the balloon (31),
   wherein a supplement hole (111) through which the toner is supplemented and a handle (112) for opening the cap (22) to take the toner storage container (1) out are disposed on an upper portion of the main body (11), and a toner discharge hole (122) through which the toner is supplied into the toner cartridge (5) is defined in a lower portion of the guide (12).

3. The automatic toner supply device of claim 2, wherein the main body (11) of the toner storage container (1) is replaced with a new main body (11) when the toner to be refilled is exhausted, a lower portion of the main body (11) and an upper portion of the guide (12) are screw-coupled to each other, a cap (113) for preventing the toner from leaking downward is disposed on a lower end of the main body (11), and when the main body (11) is screw-coupled to the guide (12), the cap (113) of the main body (11) is lifted to discharge the toner within the main body (11) downward.

4. The automatic toner supply device of claim 2, wherein an air injection hole (123) through which a portion of air discharged from the air pump (32) is injected and an air injection pipe (331) branched from a discharge-side air pipe (33) of the air pump (32) and connected to the air injection hole (123) are disposed in the lower portion of the guide (12), and an electrical valve (3311) is disposed in the air injection pipe (331) to supply the toner into the toner cartridge (5) due to an air pressure generated by injecting air into a lower portion of the toner storage container (1) when the balloon (31) is expanded, wherein the electrical valve (3311) is opened or closed by a signal of the controller (351).

5. The automatic toner supply device of claim 1, wherein a low sensor (51) is provided in the toner cartridge (5) to repeatedly expand and contract the balloon (31) by numbers that are initially input in the controller (351) when shortage of the toner is detected by the low sensor (51) to supply the toner into the toner cartridge (5).

6. The automatic toner supply device of claim 1, wherein the toner supply unit (3) further comprises a control valve

(34) disposed in the air pipe (33) to supply the air discharged from the air pump (32) into the balloon (31) or discharge the air within the balloon (31),
wherein the control valve (34) comprises a 3-way valve to inject air into the balloon (31) or discharge the air within the balloon (31) by a signal of the controller (351).

7. An automatic toner supply device (A) for automatically supplying toner into a color toner cartridge of a laser printer or copy machine, the automatic toner supply device (A) comprising:
a black toner storage container (1a) for storing black toner to be refilled;
a red toner storage container (1b) for storing red toner to be refilled;
a blue toner storage container (1c) for storing blue toner to be refilled;
a yellow toner storage container (1d) for storing yellow toner to be refilled;
an outer container (2) for accommodating the black toner storage container (1a), the red toner storage container (1b), the blue toner storage container (1c), and the yellow toner storage container (1d);
a toner supply unit (3) for respectively supplying the toner stored in the black toner storage container (1a), the red toner storage container (1b), the blue toner storage container (1c), and the yellow toner storage container (1d) into black, red, blue, and yellow toner cartridges (5a, 5b, 5c, 5d); and
a toner supply hose (4) connected to lower portions of the black, red, blue, and yellow toner storage containers (1a, 1b, 1c, 1d) to respectively transfer the black, red, blue, and yellow toner into the black, red, blue, and yellow toner cartridges (5a, 5b, 5c, 5d) by the toner supply unit (3),
wherein the toner supply unit (3) comprises:
balloons (31a, 31b, 31c, 31d) that are expanded or contracted when air is supplied to or discharged from the inside thereof to push the toner toward the cartridges or supplement lower toner with upper toner;
an air pump (32) for supplying air into the balloons (31a, 31b, 31c, 31d);
an air pipe (33) for connecting the balloons (31a, 31b, 31c, 31d) to the air pump (32);
a control part (35) comprising a controller (351) receiving signals transmitted from the black, red, blue, and yellow toner cartridges (5a, 5b, 5c, 5d) to control the toner supply unit (3),
wherein the air distributor 334 is disposed in the air pump 32 to supply and discharge air into/from each of the balloons 31a, 31b, 31c, 31d.

8. The automatic toner supply device of claim 7, wherein the outer container (2) comprises:
a body (21) constituting a frame of the outer container (2);
a cap (22) for opening or closing an upper portion of the outer container (2); and
a support (23) for supporting the body (21),
wherein the black, red, blue, and yellow toner storage containers (1a, 1b, 1c, 1d) comprise:
main bodies (11a, 11b, 11c, 11d) in which most of toner is stored; and
guides (12a, 12b, 12c, 12d) coupled to lower portions of the main bodies (11a, 11b, 11c, 11d) and disposed within the balloons (31a, 31b, 31c, 31d), respectively, each of the guides (12a, 12b, 12c, 12d) having a lower portion comprising a cone (121) angled at an angle greater than an angle of repose so that the toner is easily moved downward and providing a portion in which the toner disposed in the lower portion of each of the balloons (31a, 31b, 31c, 31d) is inserted by the expansion of the balloons (31a, 31b, 31c, 31d),
wherein a supplement hole (111) through which the toner is supplemented and a handle (112) for opening the cap (22) to take the toner storage container (1) out are disposed on an upper portion of each of the main bodies (11a, 11b, 11c, 11d), and a toner discharge hole (122) through which the toner is supplied into each of the black, red, blue, and yellow toner cartridges (5a, 5b, 5c, 5d) is defined in a lower portion of each of the guides (12a, 12b, 12c, 12d).

9. The automatic toner supply device of claim 8, wherein the main bodies (11a, 11b, 11c, 11d) of the black, red, blue, and yellow toner storage containers (1a, 1b, 1c, 1d) are replaced with new main bodies (11a, 11b, 11c, 11d) when the toner to be refilled is exhausted, a cap (113) for preventing the toner from leaking downward is disposed on a lower end of each of the main bodies (11a, 11b, 11c, 11d), and when the main bodies (11a, 11b, 11c, 11d) are respectively screw-coupled to the guides (12a, 12b, 12c, 12d), the cap (113) of each of the main bodies (11a, 11b, 11c,11d) is lifted to discharge the toner within each of the main bodies (11a, 11b, 11c, 11d)downward.

10. The automatic toner supply device of claim 8, wherein each of air injection holes (123a, 123b, 123c, 123d) through which a portion of air discharged from the air pump (32) and an air injection pipe (331) branched from the discharge-side air pipe (33) of the air pump (32) and connected to each of the air injection holes (123a, 123b, 123c, 123d) are disposed in a lower portion of each of the guides (12a, 12b, 12c, 12d), and each of electrical valves (3311a, 3311b, 3311c, 3311d) is disposed in the air injection pipe (331) so that air is injected into a lower portion of each of the black, red, blue, and yellow toner storage containers (1a, 1b, 1c, 1d) to supply the toner into each of the black, red, blue, and yellow toner cartridges (5a, 5b, 5c, 5d) by an air pressure after the balloons (31a, 31b, 31c, 31d) are expanded, wherein the electrical valves (3311a, 3311b, 3311c, 3311d) are opened or closed by a signal of the controller (351).

11. The automatic toner supply device of claim 7, wherein low sensors (51a, 51b, 51c, 51d) are respectively provided in the black, red, blue, and yellow toner cartridges (5a, 5b, 5c, 5d) to repeatedly expand and contract the balloons (31a, 31b, 31c, 31d) by numbers that are initially input in the controller (351) when shortage of the toner is detected by the low sensors (51a, 51b, 51c, 51d) to supply the toner into the toner cartridges (5a, 5b, 5c, 5d).

12. The automatic toner supply device of claim 7, wherein the toner supply unit (3) further comprises control valves (34a, 34b, 34c, 34d) disposed in the air pipe (33) to supply the air discharged from the air pump (32) into the balloons (31a, 31b, 31c, 31d) or discharge the air within the balloons (31a, 31b, 31c, 31d) by a signal of the controller (351), respectively,
wherein each of the control valves (34a, 34b, 34c, 34d) comprises a 3-way valve and is electrically opened or closed by the signal of the controller (351).

* * * * *